(12) United States Patent
Sechrist

(10) Patent No.: US 8,181,942 B2
(45) Date of Patent: *May 22, 2012

(54) LIQUID REDISTRIBUTION DEVICE FOR MULTIBED REACTORS

(75) Inventor: Paul A. Sechrist, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 791 days.

This patent is subject to a terminal disclaimer.

(21) Appl. No.: 12/147,040

(22) Filed: Jun. 26, 2008

(65) Prior Publication Data

US 2009/0324464 A1    Dec. 31, 2009

(51) Int. Cl.
*B01F 3/04* (2006.01)

(52) U.S. Cl. .................. 261/97; 261/114.5; 239/124

(58) Field of Classification Search .............. 261/97, 261/114.5; 239/124
See application file for complete search history.

(56) References Cited

U.S. PATENT DOCUMENTS

| | | | |
|---|---|---|---|
| 3,502,445 A * | 3/1970 | Hines, Jr. et al. ............ | 422/607 |
| 3,541,000 A * | 11/1970 | Hanson et al. ................ | 208/108 |
| 3,824,080 A * | 7/1974 | Sanwald ....................... | 422/605 |
| 3,824,081 A * | 7/1974 | Jones ............................. | 422/217 |
| 5,403,560 A * | 4/1995 | Deshpande et al. .......... | 422/606 |
| 5,554,346 A | 9/1996 | Perry et al. .................... | 422/195 |
| 5,567,396 A * | 10/1996 | Perry et al. .................... | 422/606 |
| 5,635,145 A * | 6/1997 | Den Hartog et al. ......... | 422/606 |
| 5,837,208 A | 11/1998 | Grott et al. .................... | 422/195 |
| 5,942,197 A | 8/1999 | Gupta et al. ................... | 422/191 |
| 6,403,854 B1 | 6/2002 | Miller et al. ................... | 585/638 |
| 6,769,672 B2 | 8/2004 | Müller ....................... | 261/114.2 |
| 6,984,365 B2 | 1/2006 | Nelson et al. ................. | 422/224 |
| 7,045,103 B2 | 5/2006 | McDougald et al. ......... | 422/191 |
| 7,052,654 B2 | 5/2006 | McDougald et al. ......... | 422/191 |
| 7,070,745 B2 | 7/2006 | Van Der Meer et al. ...... | 422/194 |
| 7,074,371 B2 | 7/2006 | McDougald et al. ......... | 422/191 |
| 7,074,372 B2 | 7/2006 | Muldowney et al. ......... | 422/194 |
| 2002/0172632 A1* | 11/2002 | Chou ........................... | 422/220 |
| 2004/0028579 A1* | 2/2004 | Van Der Meer et al. ...... | 422/194 |
| 2004/0228779 A1* | 11/2004 | McDougald et al. ......... | 422/191 |
| 2004/0234434 A1* | 11/2004 | Muldowney et al. ......... | 422/224 |
| 2006/0257300 A1 | 11/2006 | Breivik et al. ................ | 422/195 |
| 2009/0321966 A1* | 12/2009 | Sechrist ......................... | 261/97 |

* cited by examiner

*Primary Examiner* — Robert J Hill, Jr.
*Assistant Examiner* — Christopher P Jones
(74) *Attorney, Agent, or Firm* — Mark R Willis

(57) ABSTRACT

A liquid distribution device is presented for the collection and distribution of liquid between reactor or adsorbent beds. The device includes a liquid collection tray, a mixing chamber in fluid communication with the liquid collection tray, a rough distribution tray in fluid communication with the mixing chamber, a liquid distribution tray in fluid communication with the rough distribution tray, and a plurality of vapor pipes.

14 Claims, 2 Drawing Sheets

LIQUID REDISTRIBUTION DEVICE FOR MULTIBED REACTORS

FIELD OF THE INVENTION

This invention relates to co-current flow reactors or adsorbers where a liquid flows with a vapor through a fixed bed of catalyst or adsorbent. In particular, this relates to the internal components for controlling the flow of liquid through the reactor or adsorber when there are multiple reactor or adsorber beds, and for redistribution of the liquid.

BACKGROUND OF THE INVENTION

A wide variety of processes use co-current flow reactors, or reactors where there is a single phase fluid that flows over a solid bed of particulate materials, to provide for contact between the fluid and a solid. In a reactor, the solid usually comprises a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, gas treatment, and adsorption for separation.

Co-current reactors with fixed beds are constructed such that the reactor allows for the fluid to flow over the reactor bed. When the fluid is a liquid, or liquid and vapor, the fluid is usually directed to flow downward through the reactor. There are many aspects for providing good contact between the fluid and the solid. Multiple bed, or multibed, reactors are also frequently used, where the reactor beds are stacked one over the other within a reactor shell. Typically, they are stacked with some space between the beds.

With multibed reactors the space between beds are convenient mixing zones. The between bed spaces are often used to provide for intermediate treatment of the process fluid, such as cooling the process fluid, heating the process fluid, or remixing and redistribution of the process fluid.

In exothermic catalytic reactions, the control of temperature is important, and the multibed system provides a convenient place for the injection of a quench gas. In hydrocarbon processing, the quench gas is often a cool hydrogen stream. However, cooling a fluid without controlling the mixing and distribution leads to uneven heating and reactions in subsequent reactor beds. And complex mixing and distribution systems takes up valuable space in a reactor chamber holding multiple reactor beds.

The design of reactors to overcome these limitations can save significantly on the valuable space within a reactor and to better utilize a reactor chamber. Hardware for holding a reactor, the reactor shell, is expensive, and takes significant time to design and construct before putting into operation. New reactor internals that improve the utilization of the space within a reactor shell can provide significant cost savings, and obviate the need for new reactor shell components, as well as prevent the down time for replacing an entire reactor.

SUMMARY OF THE INVENTION

The present invention provides a novel device for reducing the space needed for collection and redistribution of a liquid over the top of a reactor bed. The device comprises a liquid collection tray for collecting liquid from a reactor bed above the device. The collection tray passes the liquid to a mixing chamber through outlet ports that are oriented to deliver the liquid in a swirling motion in the mixing chamber. The mixing chamber mixes the liquid and delivers the liquid through an outlet port to a liquid distribution tray. The liquid distribution tray comprises a tray, such as a bubble cap tray, for delivering the liquid over the area of the liquid distribution tray. Since the liquid is educed through the liquid distribution tray, it is relatively insensitive to the tray being out of level. The liquid is delivered from the mixing chamber through a liquid full downcomer, where the downcomer outlet extends below the top of the bubble caps to prevent splashing of the liquid.

In an embodiment, the device includes a plurality of vapor pipes, where each vapor pipe has an opening in fluid communication with the vapor space above the liquid distribution tray and an opening in fluid communication with the vapor space above the liquid collection tray. This provides a vapor by-pass without requiring the vapor to follow the same path as the liquid for redistribution. This eliminates the need for a rough distribution tray, reducing the height of the quench zone.

Other objects, advantages and applications of the present invention will become apparent to those skilled in the art from the following detailed description and drawings.

DETAILED DESCRIPTION OF THE INVENTION

Providing more space for a multibed reactor in a co-current reactor provides new life to existing reactor shells. What is not important is the equilibration of liquid with the vapor during the entrance to a quench zone, but the important aspect is good distribution of liquid over each bed. Nor is it important to have complete disengagement of liquid entrained from the vapor. By allowing the vapor to bypass a portion of the quench zone while maintaining adequate mixing of the liquid the process is improved. The important aspect is the improved liquid distribution over the bed. Improving distribution provides for a more even temperature distribution and temperature rise through the reactor. Uneven liquid distribution leads to uneven temperature distributions. Which in turn leads to the development of hot spots within the reactor bed, shortened catalyst life, and less favorable product distribution, and even unstable and undesirable product production.

Figure 1:
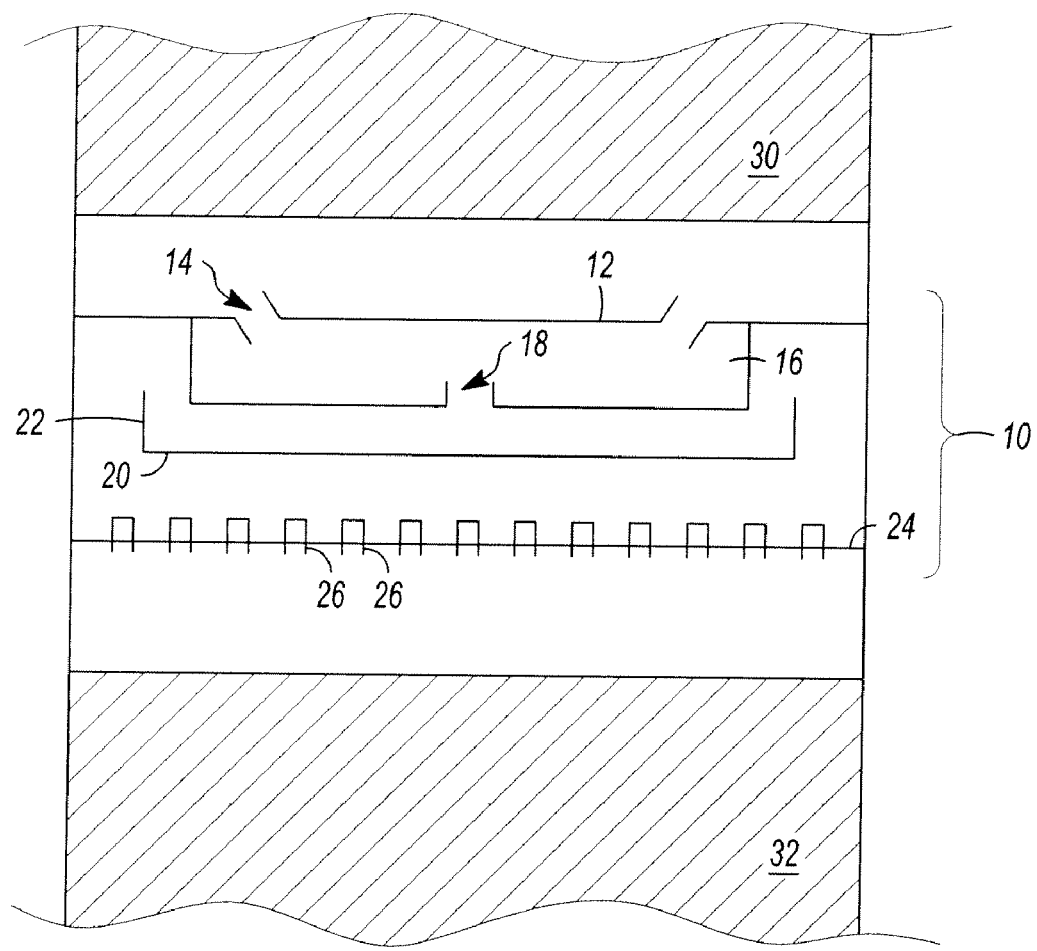
FIG. 1 is a schematic of a device for the collection and distribution of liquid between catalyst beds.

The invention comprises a device for the distribution of liquid over the top of a reactor bed in a co-current flow reactor, as shown in FIG. 1. The device 10 is for collecting fluid from a first catalyst bed 30 and redistributing the fluid to a second catalyst bed 32 where the first catalyst bed 30 is above the device 10 and the second catalyst bed 32 is below the device 10. The device 10 includes a liquid collection tray 12 and having outlet ports 14, a mixing chamber 16 in fluid communication with the liquid collection tray 12, and having an outlet 18. The device further includes a rough liquid distribution tray 20 in fluid communication with the mixing chamber outlet 18 and having an overflow weir 22 at the outer edges of the tray 20. The rough liquid distribution tray 20 is in fluid communication with a liquid distribution tray 24. The liquid distribution tray 24 has a plurality of outlet ports 26 distributed over the tray 24 for providing uniform distribution of liquid to the catalyst bed 32.

The liquid distribution tray 24 is preferably a bubble cap tray having a high density of bubble caps. The bubble cap tray can include slots in the sides of the bubble caps to facilitate liquid flow while maintaining low pressure drop across the device 10. In an alternative arrangement, the liquid distribution tray 24 can be a sieve tray where each outlet port 26 has a lip for retaining some liquid. A high density of bubble caps is preferred, as this provides a uniform distribution of liquid, and allows for a relatively small space between the liquid distribution tray 24 and the top of the reactor bed 32. It is preferred to have a space between the liquid distribution tray 24 and the top of the reactor bed 32 of between 10 and 18 cm (4 to 7 inches). In alternative configurations, the liquid distribution tray 24 can be a riser tray, or a liquid seal tray.

Figure 2:
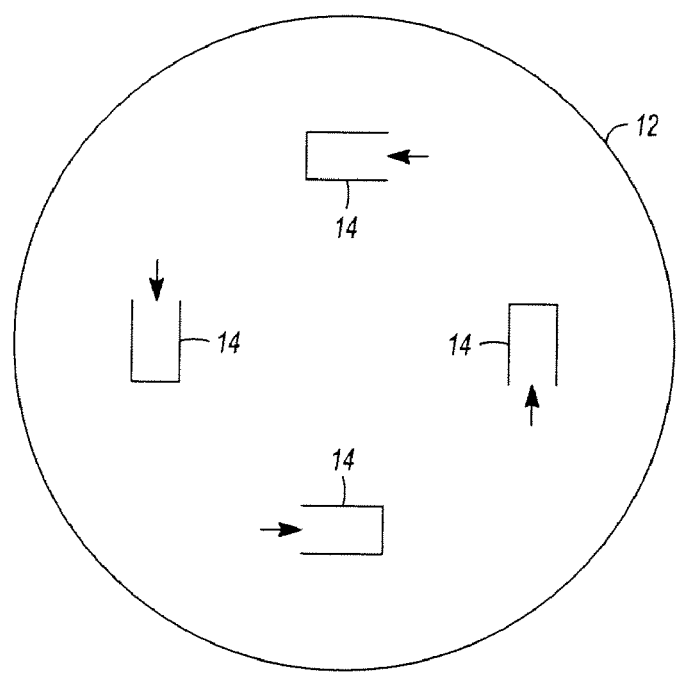
FIG. 2 is a schematic of the distribution of outlet ports for the liquid collection tray.

The liquid collection tray 12 includes a plurality of outlet ports 14 for delivering liquid to the mixing chamber, as shown in FIG. 2. The outlet ports 14 can be arrayed circumferentially around the tray 12, with a substantially even spacing. Preferably there are 4 outlet ports 14. The outlet ports 14 are further designed to deliver the liquid in a direction perpendicular to the radial direction. The liquid flowing out the outlet ports 14 has a downward and circumferential flow direction. The liquid entering the mixing chamber 16 is directed to provide a swirling motion to the liquid and thereby mixing the fluid within the chamber. This creates a process fluid that has a substantially uniform temperature and a substantially uniform distribution of liquid components before redistribution of the liquid to the catalyst bed 32 below the device 10.

Figure 3:
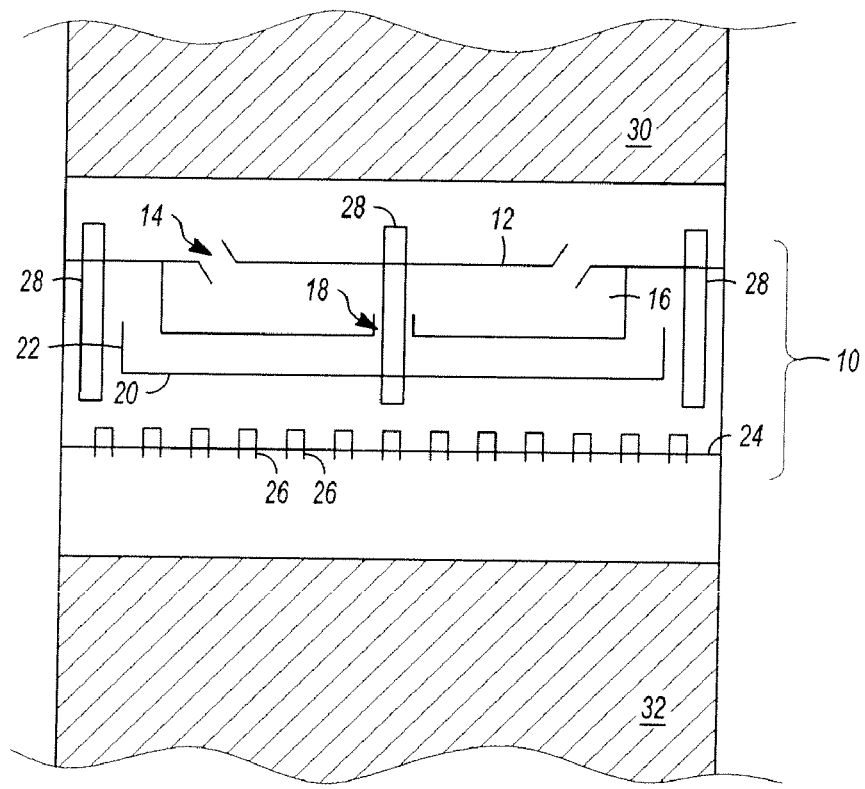
FIG. 3 is a schematic of an embodiment of the device for the collection and distribution of liquid between catalyst beds including vapor pipes.

In one embodiment, the device 10 further comprises a plurality of vapor pipes 28, as shown in FIG. 3. Liquid is collected on the liquid collection tray 12, and passes to the mixing chamber 16 where the liquid is mixed, both thermally and compositionally. The liquid then passes to the liquid distribution tray 24. The vapor pipes 28 each have an inlet in fluid communication with the vapor space above the liquid collection tray 12 and an outlet in fluid communication with the vapor space above the liquid distribution tray 24, and provide a vapor by-pass, and allow for vapor to pass from below the upper catalyst bed 30 to the space above the liquid distribution tray 24. The vapor does not need to equilibrate with the liquid. By bypassing the transport of vapor though the mixing chamber 16 the rough distribution tray is eliminated and the height of the device 10 is reduced. The vapor mixes and disperses rapidly and uniformly over the space above the liquid distribution tray 24. The vapor still provides the means to educe the liquid through the liquid distribution tray outlet ports 26. One convenient embodiment has one vapor pipe 28 located at the center of the device 10 with additional pipes 28 arrayed around the circumference of the device 10. Other distributions are possible and not shown here. However, considerations for choice of vapor pipe distributions generally are manufacturing considerations, such as the number of trays having holes placed in them for passing the vapor pipes.

With the vapor pipes 28, the space between the bottom of the mixing chamber outlets and the rough distribution tray does not need to maintain a two phase flow and allows for the reduction in space between the mixing chamber and the rough distribution tray. The maintenance of two phase flow increases the space because the gas requires a substantial volume to disengage the vapor from the liquid flow such that the vapor and liquid are fully separated above the rough distribution tray. By eliminating this need for two phase flow, the quench zone is reduced.

It was found that by having trays that have a low sensitivity for the distribution of liquid over the tray show reduced degradation of performance. This allows for trays that can move as a reactor might move, and maintains good performance of the reactor even as the liquid level becomes uneven across the tray. Therefore designs that overcome this problem provide for reactors that maintain good performance. This is especially true for bubble cap trays.

The mixing chamber 16 comprises a plate affixed to the liquid collection plate 12 with walls, and having an outlet 18 toward the center of the mixing chamber 16. The outlet includes weirs to retain some of the liquid during the mixing in the chamber 16. The liquid exiting from the outlet weir will enter a downcomer tube to feed the liquid onto the liquid distribution tray without splashing or other disturbance of the liquid on the tray.

Preferably the liquid distribution tray 24 is a bubble cap tray with a high density of bubble caps. One design uses 64 mm (2.5 inch) bubble caps distributed in a triangular pitch arrangement where the pitch is 102 mm (4 inch). This provides approximately 35% area coverage of the liquid distribution tray 24 with bubble caps.

One embodiment for the present device 10 comprises the liquid collection tray 12 as described above, a mixing chamber 16 in fluid communication with the liquid collection tray 12 and having a mixing chamber outlet 18, and a liquid distribution tray 24 in fluid communication with the mixing chamber outlet 18. The liquid distribution tray 24 can be a bubble cap tray or a sieve tray. The device 10 further includes a means for directing the liquid from the mixing chamber outlet 18 in the radial direction to spread the flow of liquid over the liquid distribution tray 24. By directing the flow of liquid over the liquid distribution tray 24 without a splash plate or a rough distribution tray, the height of the quench zone is reduced.

The device 10 can include a quench gas injection into the space between the catalyst beds 30, 32. When there is a quench gas injection, it is preferred to inject the quench gas in the vapor space above the liquid collection tray 12. A cool quench gas is injected at a position near the center axis, and sprayed in an outward radial direction above the collection tray. The spray contacts the vapor and liquid flowing downward from the reactor bed above the quench zone. Heat transfer between the two gases is a matter of gas mixing which depends on the momentum exchange between the two vapor streams. Heat transfer to the liquid is through the transfer of heat across the liquid droplet surface area.

The preferred embodiment of the device 10 comprises the liquid collection tray 12, the mixing chamber 16 in fluid communication with the liquid collection tray 12, the liquid distribution tray 12 in fluid communication with the mixing chamber outlet 18, and the plurality of vapor pipes 28. The liquid collection tray 12 has a plurality of outlet ports 14, where the outlet ports comprise channels oriented to deliver the liquid to the mixing chamber in a direction that is perpendicular to the radial direction. The liquid is directed to be in a circumferential direction with a downward component. The liquid distribution tray 24 comprises a bubble cap tray having a dense distribution of bubble caps for delivering the fluid the tray area in a substantially uniform manner.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A device for the distribution of liquid over the top of a reactor bed, comprising: a liquid collection tray having a top and a bottom, having outlet ports therein; a mixing chamber in fluid communication with the liquid collection tray, and having an outlet; and a liquid distribution tray in fluid communication with the mixing chamber outlet, and having liquid outlet ports, and wherein the liquid collection tray outlet ports comprise channels oriented to deliver the liquid in a direction perpendicular to a radial direction, and with a circumferential directional component to separate at least a portion of the liquid from a vapor phase; and a plurality of vapor pipes having a first opening positioned above the liquid distribution tray and below the liquid collection tray in fluid communication with a vapor space above the liquid distribution tray and below the liquid collection tray and a second opening configured for being positioned in a reactor above the liquid collection tray and below a reactor bed thereabove in fluid communication with a vapor space above the liquid collection tray and below the reactor bed.

2. The device of claim 1 wherein the liquid distribution tray is a bubble cap tray containing bubble caps.

3. The device of claim 2 wherein the bubble caps in the bubble cap tray include slots on the sides of the bubble caps.

4. The device of claim 1 wherein the liquid distribution tray is a sieve tray, a riser tray, or a liquid seal tray.

5. A device for the distribution of liquid over the top of a reactor bed, comprising: a liquid collection tray having a top and a bottom, having outlet ports therein; a mixing chamber in fluid communication with the liquid collection tray, and having an outlet; a liquid distribution tray in fluid communication with the mixing chamber outlet, and having liquid outlet ports; a means for passing vapor from above the liquid collection tray to below the liquid distribution tray, and wherein the liquid collection tray outlet ports comprise channels oriented to deliver the liquid in a direction perpendicular to the radial direction to separate at least a portion of the liquid from a vapor phase; and a plurality of vapor pipes having a first opening positioned above the liquid distribution tray and below the liquid collection tray in fluid communication with a vapor space above the liquid distribution tray and below the liquid collection tray and a second opening configured for being positioned in a reactor above the liquid collection tray and below a reactor bed thereabove in fluid communication with a vapor space above the liquid collection tray and below the reactor bed.

6. The device of claim 5 wherein the liquid distribution tray is a bubble cap tray containing bubble caps.

7. The device of claim 6 wherein the bubble caps in the bubble cap tray include slots on the sides of the bubble caps.

8. The device of claim 5 wherein the liquid distribution tray is a sieve tray.

9. A device for the distribution of liquid over the top of a reactor bed, comprising:
a liquid collection tray having a top and a bottom, having outlet ports therein, wherein the liquid collection tray outlet ports comprise channels oriented to deliver the liquid in a direction perpendicular to the radial direction;
a mixing chamber in fluid communication with the liquid collection tray, and having an outlet;
a liquid distribution tray in fluid communication with the mixing chamber outlet and comprising a bubble cap tray containing a plurality of bubble caps in fluid communication with the mixing chamber outlet, and having liquid outlet ports; and
a plurality of vapor pipes having a first opening positioned above the liquid distribution tray and below the liquid collection tray in fluid communication with a vapor space above the liquid distribution tray and below the liquid collection tray and a second opening configured for being positioned in a reactor above the liquid collection tray and below a reactor bed thereabove in fluid communication with a vapor space above the liquid collection tray and below the reactor bed.

10. The device of claim 9 wherein the bubble caps in the bubble cap tray include slots on the sides of the bubble caps.

11. The device of claim 9 further comprising a rough distribution tray in fluid communication with the mixing chamber outlet, and having an outlet in fluid communication with the liquid distribution tray.

12. The device of claim 11 wherein the rough distribution tray includes overflow weirs for the outlet of the rough distribution tray, and where the overflow weirs are toward the circumferential edge of the device.

13. A device for the distribution of liquid over the top of a reactor bed, comprising:
a liquid collection tray having a top and a bottom, having outlet ports therein, wherein the liquid collection tray outlet ports comprise channels oriented to deliver the liquid in a direction perpendicular to the radial direction;
a mixing chamber in fluid communication with the liquid collection tray, and having an outlet;
a rough distribution tray in fluid communication with the mixing chamber outlet, and having an outlet in fluid communication with the liquid distribution tray;
a liquid distribution tray in fluid communication with the mixing chamber outlet and comprising a bubble cap tray containing a plurality of bubble caps in fluid communication with the mixing chamber outlet, and having liquid outlet ports; and
a plurality of vapor pipes having a first opening positioned above the liquid distribution tray and below the liquid collection tray in fluid communication with a vapor space above the liquid distribution tray and below the liquid collection tray and a second opening configured for being positioned in a reactor above the liquid collection tray and below a reactor bed thereabove in fluid communication with a vapor space above the liquid collection tray and below the reactor bed.

14. The device of claim 13 wherein the bubble caps in the bubble cap tray include slots on the sides of the bubble caps.

* * * * *